United States Patent [19]

Kowal et al.

[11] Patent Number: 4,538,842
[45] Date of Patent: Sep. 3, 1985

[54] HIGH PRESSURE, LEAKPROOF, BLOWOUT-PROOF TUBE FITTING

[75] Inventors: Leonard J. Kowal, Prospect Heights; Albert J. Schwarz, Lincolnwood, both of Ill.

[73] Assignee: Imperial Clevite Inc., Glenview, Ill.

[21] Appl. No.: 530,793

[22] Filed: Sep. 8, 1983

[51] Int. Cl.³ .............................................. F16L 19/00
[52] U.S. Cl. ................................... 285/354; 285/386; 285/247; 285/234
[58] Field of Search ............... 285/354, 353, 386, 247, 285/233, 234

[56] References Cited

U.S. PATENT DOCUMENTS

| | | | |
|---|---|---|---|
| 2,212,745 | 8/1940 | McIntosh | 285/233 |
| 2,251,715 | 8/1941 | Parker | 285/354 X |
| 2,273,395 | 2/1942 | Couty | 285/234 |
| 2,332,682 | 10/1943 | Yelinek | 285/354 X |
| 2,459,609 | 1/1949 | Wolfram | 285/354 X |
| 2,463,336 | 3/1949 | Weatherhead | 285/234 |
| 2,850,299 | 9/1958 | Risley | 285/354 X |
| 3,576,335 | 4/1971 | Kowal et al. | 285/233 |
| 3,684,322 | 8/1972 | Kotsakis | 285/343 |
| 4,072,328 | 2/1978 | Elliott | 285/354 X |

*Primary Examiner*—Richard J. Scanlan, Jr.
*Attorney, Agent, or Firm*—Russell E. Baumann

[57] ABSTRACT

A tube connection having a resilient seal ring captured between a support structure at the inner end thereof and a retaining structure at the outer end thereof within an outwardly opening recess of a fitting body. The support structure is retained to the distal end of the tube to be connected against axially inward displacement therefrom. Close fits are provided between the elements of the fitting so as to effectively preclude extrusion of the seal material therebetween from the sealing space. The retaining structure in certain embodiments is defined by an annular projection on the nut member extending into the recess. In certain embodiments, the retaining structure is disposed outwardly of the recess and the sealing sleeve extends outwardly into engagement therewith. In one illustrated embodiment, the sealing sleeve is defined by an O-ring. In a number of the embodiments, the support structure is formed integrally with the tube end. Different combinations of the different structures is contemplated within the scope of the invention.

4 Claims, 13 Drawing Figures

HIGH PRESSURE, LEAKPROOF, BLOWOUT-PROOF TUBE FITTING

DESCRIPTION

1. Technical Field

This invention relates to tube fittings and in particular to high pressure resilient tube fittings.

2. Background Art

In one known form of tube fitting, an elastomeric sleeve is provided for sealing the tube end to the fitting body. The sleeve forms a cushion between the tubing and fitting and permits the tube to flex somewhat in the fitting while, at the same time, providing a positive pressure-tight seal. The use of the flexible sleeve effectively minimizes tubing failure resulting from vibration or shock, or of distortion of the tube in making up the connection. In many installations, there may be a slight angular misalignment of the tube from the axis of the fitting and, thus, the use of the sleeve permits accommodation of such misalignment without stress on the tube connection so as to provide a long, troublefree life thereof.

Further, the use of the elastomeric sleeve permits the forming of tight, leakproof joints notwithstanding deformities in the surface of the tube.

One improved tube connection utilizing such a resilient sleeve is illustrated in U.S. Pat. No. 3,576,335, of Leonard J. Kowal et al., which patent is owned by the assignee hereof. As shown therein, the tube end is provided with an enlargement for retaining the tube end in the fitting by virtue of its interference with the resilient annular seal member received between the enlargement and the nut member flange. As disclosed, the tube end enlargement may be secured to the tube end or may be formed in the tube end, as desired. As further disclosed, the enlargement has an outer diameter substantially less than the diameter of the wall surface defining the recess in which the enlargement is received.

Another improved vibration-resistant coupling is illustrated in U.S. Pat. No. 3,684,322 of Mike D. Kotsakis, which patent is also owned by the assignee hereof. As shown therein, the elastomeric seal ring is disposed outwardly of the fitting recess receiving the end of the tube and is captured thereagainst by the surrounding nut structure. Within the elastomeric ring is a substantially rigid gripping element and means responsive to axial compression of the ring to urge the gripping element into gripping association with the outer wall of the tube being connected.

DISCLOSURE OF THE INVENTION

The present invention comprehends an improved flexible fitting.

More specifically, the present invention comprehends the provision of such a fitting wherein the sealing material is substantially totally enclosed so that effectively it cannot be extruded from the sealing space. Resultingly, softening of the seal material as from exposure to heat is effectively prevented from destroying completely the sealing effect.

The improved fitting encloses the elastomeric seal in a smooth surface cavity, thereby eliminating possible shredding of the seal material as may occur in prior art devices. By avoiding such shredding, contamination of the fluid system as by passage of shredded material thereinto is effectively precluded.

The fitting is further arranged so that compression of the seal means requires substantially less force than in prior art designs so that make-up of the fitting may be effected with minimal torque.

The fitting is adapted for repeated assembly and disassembly without loss of sealing and tube connecting strength.

Further, as the amount of compression of the seal is effectively minimized, possible deformation of the tube by the compression of the seal is effectively avoided.

More specifically, the invention comprehends the provision of such a tube connection having a fitting member defining an outwardly opening recess for receiving the end of a tube to be connected, and a retaining member adjustably secured to the fitting member for use in retaining the tube end in the recess, and improved sealing structure including resilient seal means extending annularly about the tube outwardly of the distal end thereof in the recess, rigid annular support means on the distal end of the tube having a close fit with the wall of the fitting member defining the recess for preventing extrusion of the seal means inwardly past the support means, and means on the retaining member for effectively compressively retaining the seal means in the recess as an incident of adjusted securing of the retaining member to the fitting member in a made-up arrangement of the fitting, whereby the seal means is captured between the support means and the means on the retaining member and resiliently seals the tube end to the fitting member.

In the illustrated embodiment, the annular support means comprises a rigid support ring extending about the tube inwardly of the seal means in the recess and having an outer diameter defining a close fit with the wall of the fitting member defining the recess, cooperating means on the tube end and support ring for preventing axially outward movement of the distal end of the tube through the support ring, and shoulder means on the tube end defining a radially enlarged distal end thereof cooperating with the support ring for retaining the support ring against axially inward displacement from the tube end.

In another modification, the invention comprehends the provision of the support means in the form of radially outturned annular means on the tube end having a close fit with the wall of the fitting defining the recess for preventing extrusion of the seal means inwardly past the annular means.

The improved tube connection of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
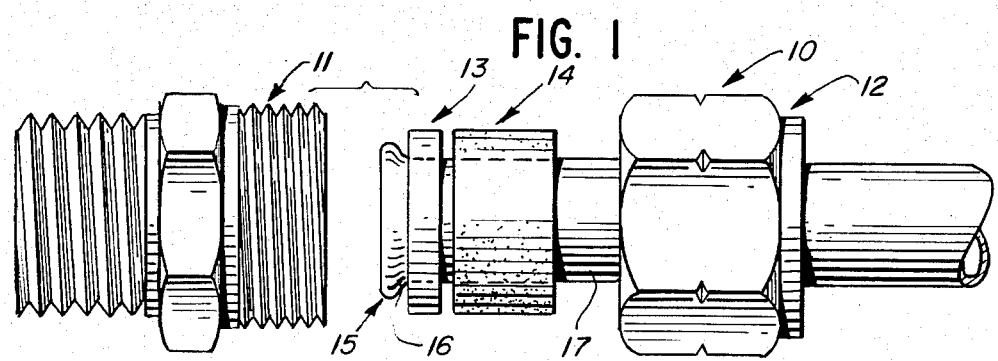
FIG. 1 is a side elevation of a tube connection embodying the invention prior to the make-up thereof.

In the exemplary embodiments of the invention as disclosed in the drawing, a tube connection generally designated 10 is shown to include a fitting, or body, 11, a retaining member, or nut, 12, support means, or ring, 13, and a sealing means, or sleeve, 14.

Figure 2:
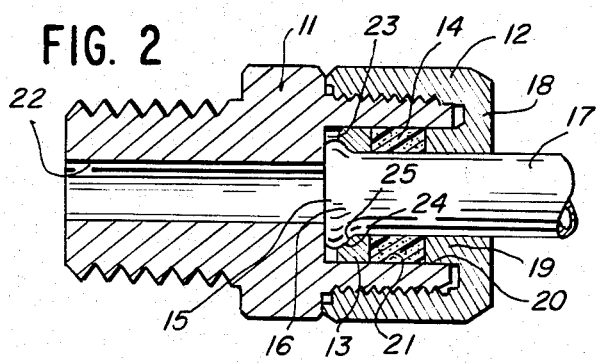
FIG. 2 is a fragmentary diametric section of the fitting upon completion of the make-up thereof.

Means 15 are provided for retaining the support ring against axial inward displacement from the distal end 16 of a tube end 17 to be connected in the fitting. In the embodiment of FIGS. 1 and 2, means 15 comprises a radially enlarged distal end 16 of the tube end.

As best seen in FIG. 2, the flange 18 of nut 12 is provided with an axially inturned annular projection 19 fitted into the outer end 20 of a recess 21 opening outwardly from a through bore 22 in the fitting body 11. The inner end of the recess is defined by a planar surface 23 against which the distal end 16 of tube end 17 abuts in the made-up arrangement of the fitting, as shown in FIG. 2.

As further illustrated in FIG. 2, in the made-up arrangement of the fitting, nut projection 19 compressively urges seal ring 14 inwardly against the support ring 13 which, in turn, is urged against the radially enlarged retaining means 15.

In the illustrated embodiment, the outer diameters of the support ring 13 and annular projection 19 are preselected to provide a close fit with the wall of the fitting body defining recess 21. The inner diameters of the support ring and projection 19 are preselected so as to provide a close fit with the outer surface of the tube end 17, thereby to effectively preclude extrusion of the compressed sealing ring material therebetween in the made-up arrangement of the fitting, as shown in FIG. 2.

As further illustrated in FIG. 2, the outer surface 24 of the enlargement 15 is rounded and the confronting inner surface portion 25 of the support ring is complementary thereto so as to have facial engagement therewith in the made-up arrangement of the fitting. As will be obvious to those skilled in the art, the inner end of the support ring may be planar, if desired.

Thus, the sealing ring 21 is effectively captured or enclosed in the space in recess 21 between the support ring 13 and the inner end of the projection 19.

As can be seen, the generally cylindrical configuration of the resilient seal sleeve is maintained in the make-up of the fitting. The length of the nut 12 is preselected so as to define means for effectively limiting the compression of the seal means by the engagement thereof with the body 11 in the made-up condition, as shown in FIG. 2.

Resultingly, in the event the fitting is subjected to high temperature tending to soften the seal material, the seal material nevertheless does not substantially flow from the sealing space because of its substantial enclosure within the cooperating elements. As all surfaces confronting the seal ring are smooth, shredding or deformation of the seal ring is effectively precluded. The make-up of the fitting may be effected with minimal torque and, as discussed above, the completion of the make-up is automatically indicated by the abutment of the nut with the body. As there is no deformation of the sleeve other than the compressive longitudinal contraction and resultant radial enlargement thereof, the fitting may be repeatedly assembled and disassembled without affecting the sealing characteristics thereof.

It should further be noted that the fitting is self-compensating relative to pressure of the fluid being conducted through the fitting and that the higher the pressure, the greater the force urging the support ring against the sealing means so that the sealing pressure is automatically increased as a function of the fluid pressure. As the sealing compression is effected with low torque, the radial compressive force on the tube is maintained far below the load level at which the tube would become deformed thereby.

The embodiments of FIGS. 3-13 illustrate modifications comprehended within the broad scope of the invention.

Figure 3:
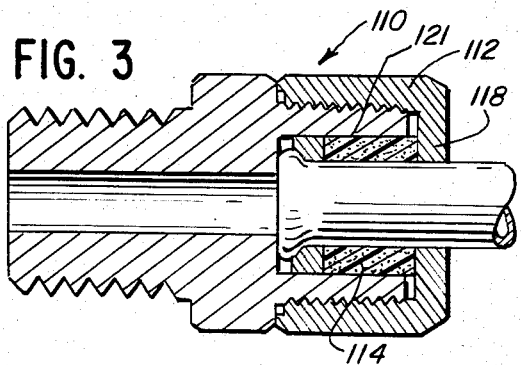
FIGS. 3–13 are fragmentary diametric sections of a number of additional embodiments of the invention.

Illustratively, in FIG. 3, a modified form of tube connection generally designated 110 embodying the invention is shown to comprise a tube connection similar to tube connection 10 but wherein the nut 112 is not provided with the projection 19, so that the flange 118 is disposed outwardly of the recess 121. As shown, the seal ring 114 extends outwardly from the recess into engagement with the nut flange 118. In all other respects, tube connection 110 is similar to tube connection 10 and functions in a similar manner.

Figure 4:
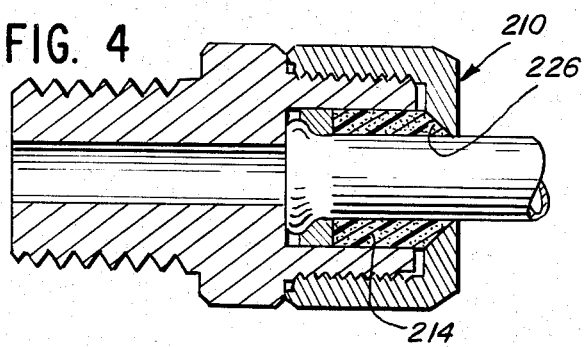

Referring to the embodiment of FIG. 4, a tube connection generally designated 210 is shown to comprise a tube connection generally similar to tube connection 110 but wherein the flange defines a frustoconical, inwardly widening surface 226 engaged by the outer end of the seal ring 214. Surface 226 tends to urge the outer end of the seal ring inwardly toward the tube. The embodiments of FIGS. 3 and 4 may be utilized where lower fluid pressures are to be handled.

Figure 5:
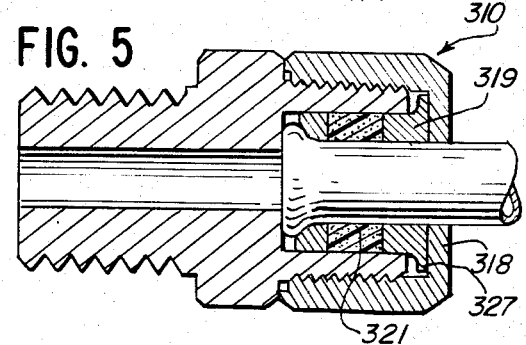

Referring to FIG. 5, a further modified form of tube connection generally designated 310 is shown to comprise a tube connection generally similar to tube connection 10, but wherein the projection 319 extending into the outer end of recess 321 comprises an element separate from the nut flange 318. As shown, the projection element 319 may be provided with an outturned outer flange 327 having a radial extent substantially similar to that of flange 318 of the nut member for improved force transfer therebetween. In all other respects, tube connection 310 is similar to tube connection 10 and functions in a similar manner.

Figure 6:
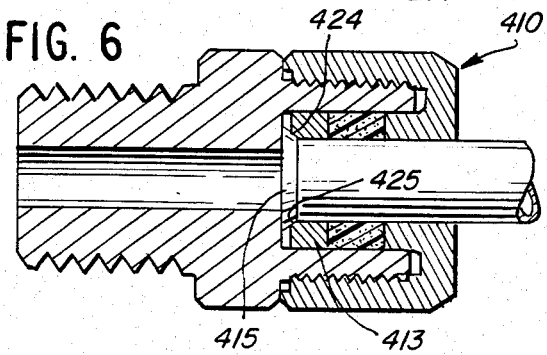

Referring to the embodiment of FIG. 6, a tube connection generally designated 410 is shown to comprise a tube connection generally similar to tube connection 10 but wherein the tube end enlargement 415 comprises a frustoconical flare. As shown, support ring 413 is provided with an inner surface 425 engaging the frustoconical outer surface 424 of the tube distal end enlargement 415. Tube connection 410 is similar to tube connection 10 in all other respects and functions in a similar manner.

Figure 7:
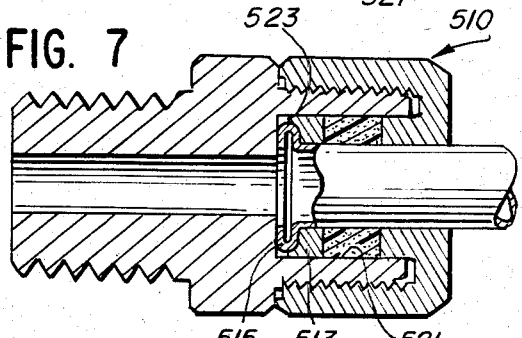

As seen in FIG. 7, a tube connection generally designated 510 is shown to comprise a tube connection generally similar to tube connection 410 but wherein the distal tube end enlargement 515 comprises a folded, or re-turned, belled portion having surface engagement with the inner end surface 523 of the recess 521. As shown, the outer end of the support ring 513 is complementary to the formed end 515 of the tube.

Figure 8:
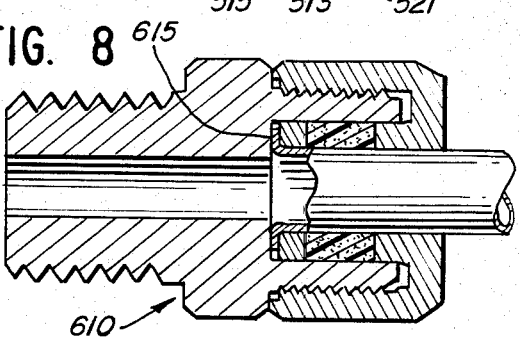

As shown in FIG. 8, another modified form of tube connection generally designated 610 is shown to comprise a tube connection generally similar to tube connection 410 but wherein the distal end of the tube defines an outturned flange 615.

Figure 9:
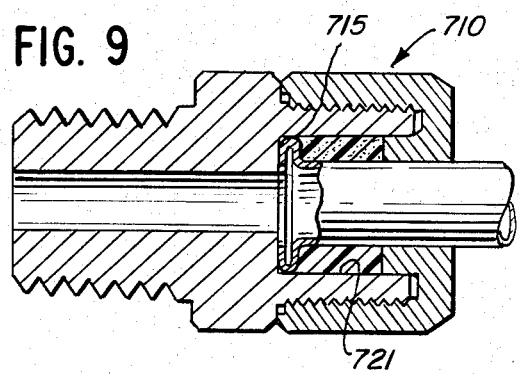

Referring to FIG. 9, still another embodiment of the invention is shown to comprise a tube connection generally designated 710. Tube connection 710 is generally similar to tube connection 510 but defines a modified form of re-turned distal end 715 having an outer diameter similar to the diameter of recess 721 so as to have a close fit therewith and thereby serve as the support ring across the seal space at the inner end thereof and eliminating the need for the provision of the separate support rings of the previously described embodiments. In all other respects, tube connection 710 is similar to and functions in a similar manner to tube connection 510.

Figure 10:
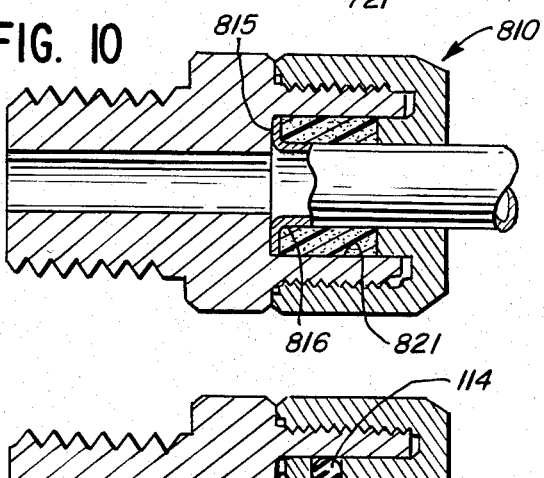

Referring to FIG. 10, another form of tube connection generally designated 810 is shown to comprise a tube connection generally similar to tube connection 710 but wherein the support means is defined by an outturned flange 815 formed integrally with the distal end 816 of the tube end. Flange 815 defines an outer diameter similar to the diameter of the recess 821 so as to have a close fit therewith and function in the manner of the support ring of the embodiments of FIGS. 1–8.

Figure 11:
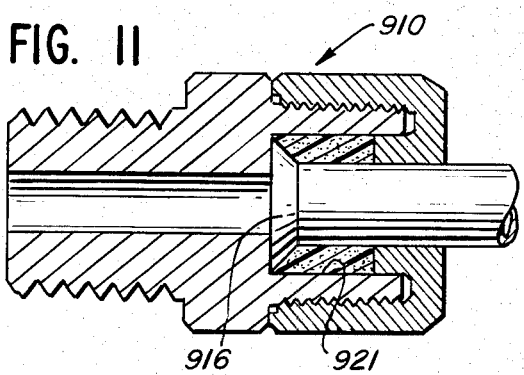

Referring to FIG. 11, still another modified form of tube connection generally designated 910 is shown to comprise a tube connection generally similar to tube connection 710 and 810 but wherein the enlarged distal end 916 comprises a frustoconical flared end of the tube having an outer diameter substantially equal to the diameter of the recess 921 so as to have a close fit therewith. Thus, each of tube connections 710, 810 and 910 functions similarly in the use of an enlarged distal end of the tube having a close fit with the wall of the body defining the recess 921 and functioning in a similar manner to the embodiments of FIGS. 1–8 without the provision of the separate support ring thereof.

Figure 12:
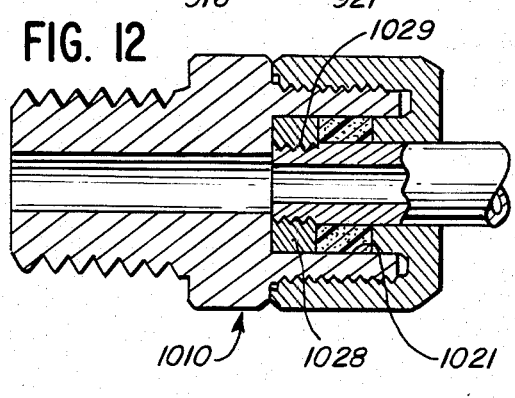

In FIG. 12, still another form of tube connection generally designated 1010 is seen to comprise a tube connection generally similar to tube connection 10 but wherein the radially enlarged distal end of the tube is replaced by an annular ring 1028 secured to a threaded end portion 1029. In the illustrated embodiment, the ring is secured to the tube. As will be obvious to those skilled in the art, any suitable method of securing the ring to the tube may be employed, including brazing, welding, adhesive bonding, etc. The outer diameter of ring 1028 is similar to the diameter of the recess 1021 so as to have a close fit with the wall of the body defining the recess. In all other respects, tube connection 1010 is similar to and functions in a similar manner to tube connection 10.

Figure 13:
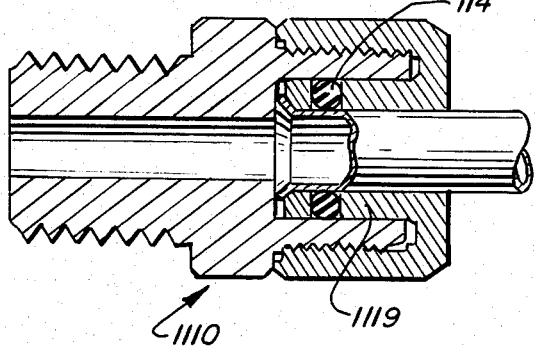

Referring to the embodiment of FIG. 13, a tube connection generally designated 1110 is shown to comprise a tube connection generally similar to tube connection 410 but wherein the nut projection 1119 is elongated and the tubular sealing ring is replaced with a circular cross section O-ring 1114. In all other respects, tube connection 1110 is similar to tube connection 410 and functions in a similar manner.

As will be obvious to those skilled in the art, structures of the different embodiments herein as to the construction of the support means may be utilized with any of the other embodiments, and similarly, embodiments herein as to the structures of the retaining means may be used with any of the other embodiments within the scope of the invention. Similarly, the use of the O-ring illustrated in FIG. 13 may be similarly utilized in the other embodiments by suitable adjustment of the configurations thereof.

In each of the embodiments discussed above, a cushioned sealing engagement of the seal means with the tube is effected notwithstanding tube surface irregularities and deformations, including out-of-roundness, tolerances, seams, nicks and scratches, etc. Each of the tube connections provides faciliated makeup while assuring a leakproof connection of the tube to the fitting over a wide range of pressures, including high pressures. The use of the elastomeric seal ring provides for accommodation of vibration and misalignment, as discussed above, providing improved sealing connection of the tube for long, troublefree life.

As will be obvious to those skilled in the art, the seal means may be formed of a compressible material, such as conventional valve packing material, within the scope of the invention. Such material may be utilized where the fitting is intended for use at high temperatures, for example. Similarly, where the fluid being handled is corrosive or attacks conventional elastomeric seal material, such relatively inert packing materials have been found to be efficacious. One example of such an inert material suitable for use as the seal means herein is polytetrafluoroethylene.

As there are no stress concentration points outboard of the seal means in the fitting of the invention, long, vibration-resistant, troublefree life is obtained.

As will be further obvious to those skilled in the art, any form of tube end deformation may be utilized to provide the desired enlargement, including flaring, flanging, beading, cold heading, belling, upsetting, forging, etc.

The foregoing disclosure of specific embodiments is illustrative of the broad inventive concepts comprehended by the invention.

We claim:

1. In a tube connection having a fitting member defining an outwardly opening right-circularly cylindrical recess for receiving the end of a tube to be connected, the tube end comprising a radially outwardly enlarged distal portion, and a retaining member adjustably secured to the fitting member for use in retaining the tube end in said recess, the improvement comprising:

tubular seal means having a right-circularly cylindrical radially outer surface and a right-circularly cylindrical radially inner surface arranged to be disposed annularly about the tube axially outwardly of the enlarged distal portion thereof and fully within said recess;

a rigid annular support ring arranged to be disposed about the tube axially inwardly of the seal means to be retained against axial displacement inwardly from the tube by the enlarged distal portion thereof and having a close axially movable fit with the wall of the fitting member defining said recess and arranged to have close axially movable fit with the radial outer surface of the tube end for preventing extrusion of the seal means axially inwardly past said support ring, said support ring having an axially inner end preselected to abut the enlarged distal portion of the tube end with a complementary facial engagement therewith; and means formed integrally with said retaining member defining a tubular wall adapted to be slidably fitted between the radially outer surface of the tube end and the wall of the fitting member defining said recess for effectively compressively retaining the seal means in said recess as an incident of adjusted securing of the retaining member to the fitting member in a made-up arrangement of the fitting, said tubular seal means defining opposite planar ends and said support ring and tubular wall defining planar surfaces abutting said planar ends of the seal means whereby the seal means effectively fully fills the annular space about the tube between said support ring and the axially inner end of said wall of the retaining member to seal the tube end to the fitting member.

2. The tube connection of claim 1 wherein said support ring defines a frustoconical surface engaging the enlarged distal portion of the tube end.

3. The tube connection of claim 1 wherein said support ring defines an annular, radially inwardly concave rounded cross section surface engaging the complementary enlarged distal portion of the tube end.

4. The tube connection of claim 1 wherein said support ring defines an annular, radially outwardly convex rounded cross section surface engaging the complementary enlarged distal portion of the tube end.

* * * * *